(12) United States Patent
Nagus et al.

(10) Patent No.: US 11,059,731 B2
(45) Date of Patent: Jul. 13, 2021

(54) CONDENSATE NEUTRALIZER ALERT

(71) Applicant: Axiom Industries Ltd., Saskatoon (CA)

(72) Inventors: Kirk Nagus, Saskatoon (CA); Ian Slinger, Saskatoon (CA)

(73) Assignee: Axiom Industries Ltd., Saskatchewan (CA)

( * ) Notice: Subject to any disclaimer, the term of this patent is extended or adjusted under 35 U.S.C. 154(b) by 0 days.

(21) Appl. No.: 16/735,022

(22) Filed: Jan. 6, 2020

(65) Prior Publication Data

US 2020/0216338 A1 Jul. 9, 2020

(51) Int. Cl.
*C02F 1/66* (2006.01)
*C02F 103/18* (2006.01)

(52) U.S. Cl.
CPC ............ *C02F 1/66* (2013.01); *C02F 2103/18* (2013.01); *C02F 2209/42* (2013.01)

(58) Field of Classification Search
None
See application file for complete search history.

(56) References Cited

U.S. PATENT DOCUMENTS

| | | | |
|---|---|---|---|
| 3,596,675 A * | 8/1971 | Krueger | A47J 31/461 137/389 |
| 4,543,892 A | 10/1985 | Tomlinson et al. | |
| 6,644,027 B1 * | 11/2003 | Kelly | F03B 15/00 60/498 |
| 9,957,175 B2 | 5/2018 | Marshall | |
| 2018/0216849 A1 | 8/2018 | Deivasigamani et al. | |

* cited by examiner

*Primary Examiner* — Richard C Gurtowski
(74) *Attorney, Agent, or Firm* — Patterson Thuente Pedersen, P.A.

(57) ABSTRACT

A condensate neutralizer for connection to an appliance that discharges an acidic condensate liquid includes a reservoir containing a neutralizing media. An input conduit receives the acidic condensate liquid, and is connected to a reservoir inlet and a reservoir outlet is connected to a drain such that acidic condensate liquid flowing through an operating path flows through the neutralizing media to the drain. A bypass path connects the appliance directly to the drain such that acidic condensate liquid does not flow through the neutralizing media when flow through the operating path is restricted. A float is configured to move to a raised position where the float provides an alert visible to an operator when the acidic condensate liquid flows through the bypass path, and a float lock is operative to lock the float in the raised position.

10 Claims, 3 Drawing Sheets

CONDENSATE NEUTRALIZER ALERT

RELATED APPLICATION

The present application claims priority to Canadian Application No. 3,029,172 filed Jan. 8, 2019, which is hereby incorporated herein in its entirety by reference.

This disclosure relates to the field of high efficiency gas appliances and in particular a condensate neutralizer apparatus for reducing the acidity of condensate from such appliances.

BACKGROUND

In high efficiency condensing combustion appliances such as furnaces water vapor in the flue gases is condensed and typically collected and put through a neutralizer and drained. This condensate is acidic containing concentrations of various acids at a pH of about 2-4 and is harmful to drainage pipes, septic tanks, and like liquid waste systems.

A condensate neutralizer is thus typically used with a high efficiency natural gas condensing appliance. The condensate neutralizer is filled with a neutralization media such as crushed high calcium carbonate rock and/or magnesium oxide. The neutralization media will chemically combine with the acidic condensate and neutralize the pH of the water. The condensate neutralizer is configured so that the acidic condensate entering the inlet must pass through the neutralization media and be neutralized before draining out the outlet of the condensate neutralizer and into a floor drain or like waste system.

U.S. Pat. No. 9,957,175 to Marshall describes such a condensate neutralizer. United States Published Patent Application Number 2018/0216849 of Deivasigamani et al. also describes a condensate neutralizer which includes alarms to indicate when the condensate neutralizing materials have become nearly depleted, to indicate leaks, and like undesirable conditions that may develop.

A commonly occurring situation in such condensate neutralizers is where the flow path through the condensate neutralizer becomes plugged over time by debris, dust in the air, rust from the heat exchanger inside the condensing appliance and like material such that the rate of condensate flow through the neutralizing media gradually slows. To prevent the condensate from flooding onto the floor an over-flow bypass can be installed however condensate flowing over the bypass is of course not being effectively neutralized.

In a typical installation when the flow path through the neutralizing media is partially plugged the condensate level will rise when the appliance is operating and condensate is flowing into the condensate neutralizer. If the rate of flow through the neutralizing media is less than the rate of condensate flowing out of the appliance into the condensate neutralizer the level of condensate in a reservoir at the inlet of the condensate neutralizer will rise and flow through the bypass and directly into the floor drain without being neutralized. A system for alerting the user to the need of servicing a plugged condensate neutralizer is disclosed in U.S. Pat. No. 4,543,892 to Tomlinson et al.

SUMMARY OF THE INVENTION

The present disclosure provides a condensate neutralizing apparatus that overcomes problems in the prior art.

In a first embodiment the present disclosure provides a condensate neutralizer apparatus for connection to an appliance that discharges an acidic condensate liquid. The apparatus comprises a reservoir containing a neutralizing media. An input conduit is adapted for connection to the appliance to receive the acidic condensate liquid, and the input conduit is connected to a reservoir inlet of the reservoir and a reservoir outlet of the reservoir is connected to a drain such that acidic condensate liquid flowing through an operating path flows through the neutralizing media to the drain. A bypass path connects the appliance to the drain such that acidic condensate liquid from the appliance flows through the bypass path directly to the drain without flowing through the neutralizing media when flow through the operating path is restricted. A float is configured to move to a raised position where the float provides an alert visible to an operator when the acidic condensate liquid flows through the bypass path, and a float lock is operative to lock the float in the raised position.

In a second embodiment the present disclosure provides a method of alerting an operator to flow restrictions in a condensate neutralizer connected to an appliance that discharges an acidic condensate liquid where the condensate neutralizer comprises an operating path for acidic condensate liquid from the appliance through a neutralizing media to a drain, and the condensate neutralizer provides a bypass path for acidic condensate liquid from the appliance directly to the drain when acidic condensate liquid flow through the neutralizing media is restricted. The method comprises providing a float operative to move to a raised position visible to an operator when the acidic condensate liquid flows through the bypass path and locking the float in the raised position.

A float is configured to rise to indicate when acidic condensate liquid is bypassing the neutralizing media in a condensate neutralizer, and the float is locked in a raised position to alert an operator that the neutralizer require attention at any time after the first occurrence of bypassing.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
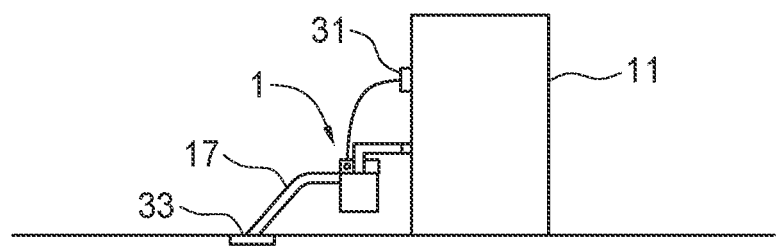
FIG. 1 is a schematic side view of an embodiment of the condensate neutralizer apparatus of the present disclosure mounted to a condensate emitting appliance, such as a high efficiency gas furnace.
Figure 2:
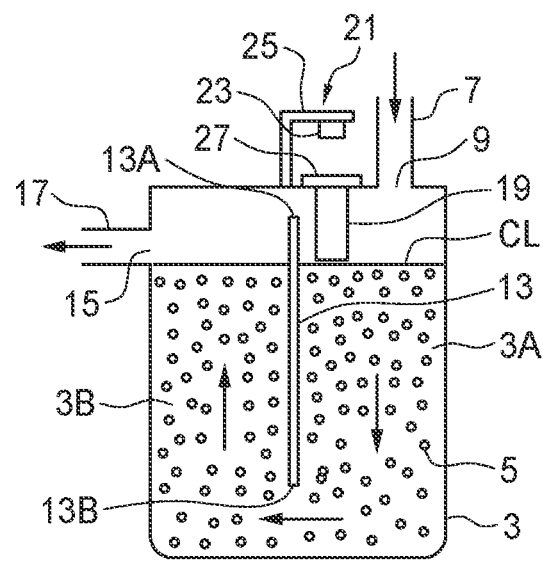
FIG. 2 is a schematic sectional side view showing the apparatus of FIG. 1 operating normally.
Figure 3:
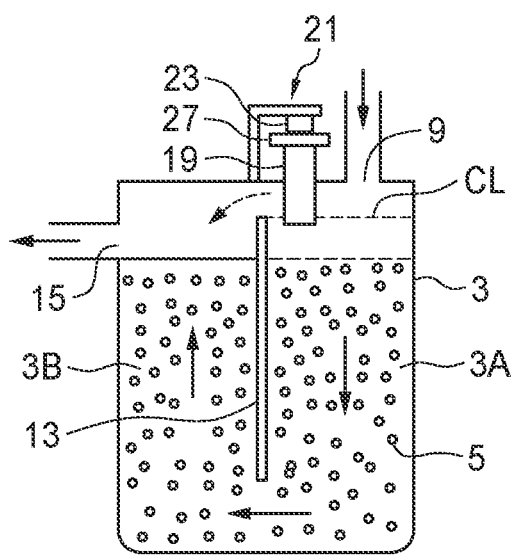
FIG. 3 is a schematic sectional side view showing the apparatus of FIG. 1 where the neutralizing media is plugged and un-processed condensate is flowing over a dividing wall directly through the output port, and with the float secured to the float lock.
Figure 4:
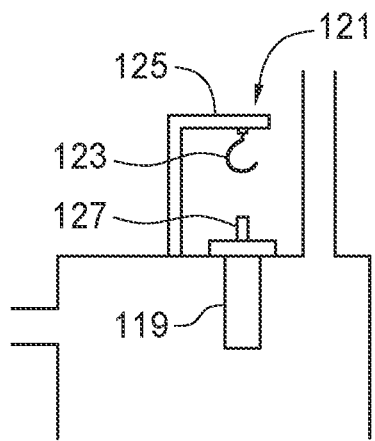
FIG. 4 is a schematic sectional side view of an alternate float lock with the float in the lowered normal operating position.
Figure 5:
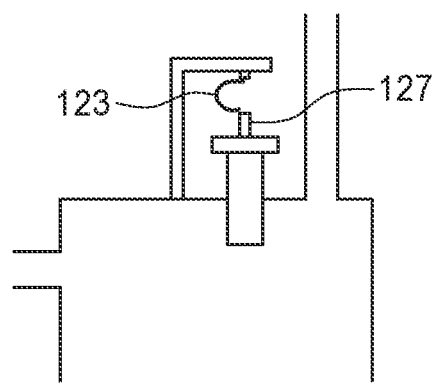
FIG. 5 is a schematic sectional side view of the alternate float lock of FIG. 4 with the float raised in contact with the hook and pivoting the hook to the side.
Figure 6:
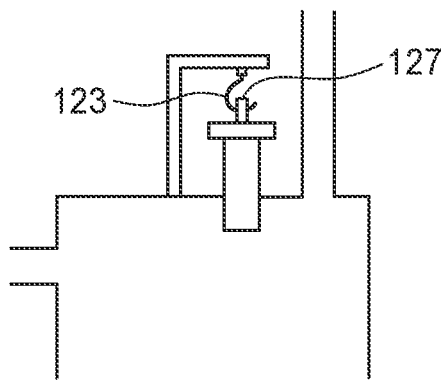
FIG. 6 is a schematic sectional side view of the alternate float lock of FIG. 4 with the float locked in a raised position with the hook engaged in a hole in the plate extending upward from the float.
Figure 7:
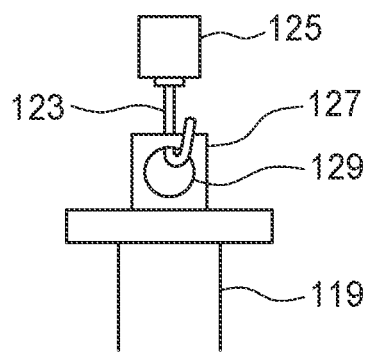
FIG. 7 is a schematic end view of the alternate float lock of FIG. 4 with the float locked in the raised position as shown in FIG. 6.

FIGS. 1-3 schematically illustrate an embodiment of a condensate neutralizer apparatus 1 of the present disclosure comprising a reservoir 3 filled with particles of a neutralizing media 5, typically calcium carbonate rock, magnesium oxide, or the like. An input conduit 7 connects reservoir inlet 9 of the reservoir 3 to an appliance 11, such as a high efficiency gas furnace or the like, that discharges acidic condensate liquid through the input conduit 7 into the reservoir 3 through the reservoir inlet 9.

A divider wall 13 divides the reservoir 3 into an input side 3A and an output side 3B such that condensate liquid flows from the reservoir inlet 9 downward through the neutralizing media 5 in the input side 3A, under a bottom edge 13B of the divider wall 13 then upward through the neutralizing media 5 in the output side 3B and out through a reservoir outlet 15 and into an output conduit 17 connected to a drain 33. In normal operation then the condensate liquid flows along a path indicated by the arrows in FIG. 2. As the condensate liquid passes through the neutralizing media 5, chemical reactions occur which reduce the acidity of the condensate liquid.

The condensate liquid can carry debris such as rust from the heat exchanger inside the appliance 11 and as the condensate liquid flows through the neutralizing media 5 this debris gathers in the neutralizing media 5 and resists the flow of condensate liquid. In an appliance 11 such as furnace, the furnace turns on and off over the course of time and likewise discharges the acidic condensate liquid at varying rates between zero flow and a maximum flow which the condensate neutralizer apparatus 1 is designed to accommodate.

As debris builds up in the neutralizing media 5 the resistance to flow increases and the condensate liquid level in the input side 3A of the reservoir 3 rises above the neutralizing media 5 in the input side 3A of the reservoir 3, and then as the condensate liquid flow from the appliance 11 into the reservoir inlet 9 stops or slows the level of condensate liquid will again fall. A float 19 is mounted in the top portion of the input side 3A of the reservoir 3 and configured such that as condensate liquid rises and falls above the neutralizing media 5 in the input side 3A of the reservoir 3 the float 19 moves correspondingly upward and downward.

The condensate liquid flow through the neutralizing media 5 can slow to the extent that as condensate liquid flows into the input side 3A of the reservoir 3 the condensate level CL rises, as indicated by the phantom line in FIG. 3, to a top edge 13A of the divider wall 13 and un-processed condensate liquid flows over the top edge 13A of the divider wall 13 and directly out the output port as shown by the arrow in phantom lines in FIG. 3.

The float 19 is configured such that when the condensate level rises to a level near the top edge 13A of the divider wall 13, the float 19 rises to a raised position where the top end of the float 19 engages a float lock 21 such that the float 19 is secured to the float lock 21 and when the condensate liquid level in the input side 3A of the reservoir 3 falls as condensate liquid flow into the reservoir falls, the float 19 is maintained in the raised position of FIG. 3 above the top of the reservoir 3 where it is visible. The float 19 is typically a highly visible color to alert an operator checking the condensate neutralizer 1 that the neutralizing media 5 is plugged with debris and the condensate flow is plugged to the extent that un-processed condensate is flowing out of the reservoir outlet 15, or is about to flow out of the reservoir outlet 15.

Alternatively the float 19 can be connected to a light or buzzer 31 as shown in FIG. 1 to alert the operator with light or sound.

In the illustrated apparatus 1 of FIGS. 2 and 3 the float lock 21 is a magnetic lock provided by a magnet 23 attached to a lock hanger 25 and the top end of the float 19 includes a steel element 27 that is attracted to the magnet 23. The magnet can of course also be attached instead to the float 19 and the steel element to the lock hanger 25.

FIGS. 4-7 schematically illustrate an alternate float lock 121 comprising a hook 123 pivotally attached to a lock hanger 125 and a plate 127 extending upward from the float 119 and defining a hole 129. As the float 119 rises the top end of the plate 127 contacts and pivots the hook 123 to the side and when the float 119 rises further the hook 123 pivots back and engages the hole 129, securing the float in the raised visible position.

It is contemplated that other float lock systems comprising latches, adhesives, and the like could be used as well to secure the float in the raised visible position to alert an appliance user that the neutralizing media 5 in the condensate neutralizer apparatus 1 is plugged.

Figure 8:
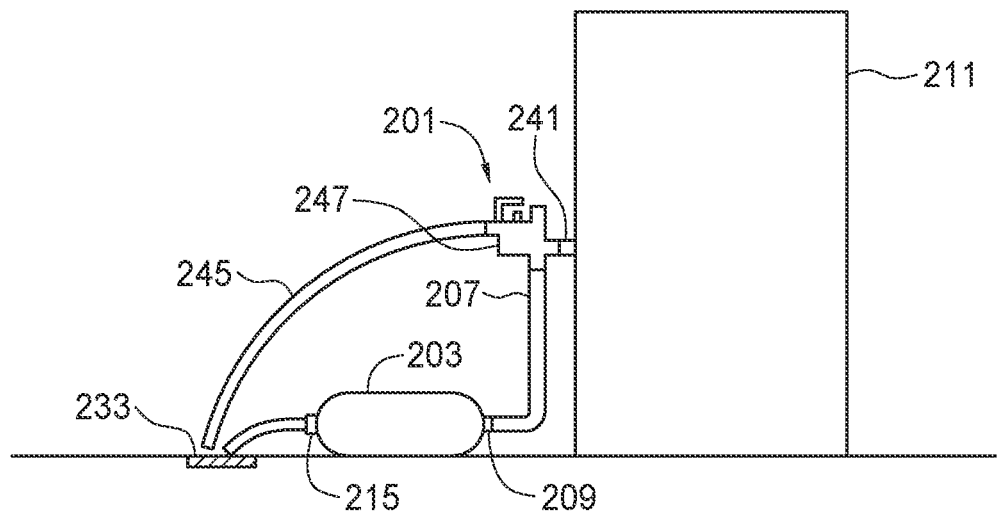
FIG. 8 is a schematic side view of an alternate embodiment of the condensate neutralizer apparatus of the present disclosure mounted to a condensate emitting appliance, such as a high efficiency gas furnace.
Figure 9:
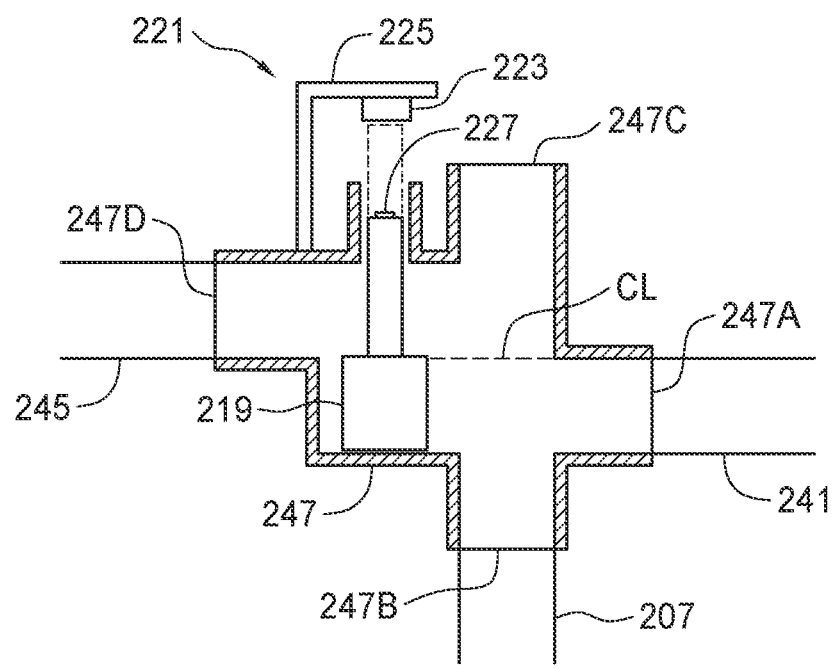
FIG. 9 is a schematic sectional view of the discharge connector fitting of the embodiment of FIG. 8.

FIGS. 8 and 9 schematically illustrate an alternate condensate neutralizer apparatus 201 of the present disclosure for connection to an appliance 211 that discharges an acidic condensate liquid through a discharge port 241. The apparatus 201 comprises an input conduit 207 adapted for connection to the discharge port 241 such that the input conduit 207 extends downward from the discharge port 241 to a reservoir containing a neutralizing media. In the apparatus 201 the reservoir comprises a sealed container 203 filled with neutralizing media and the input conduit 207 is connected to the reservoir inlet 209 at a first end of the sealed container and the reservoir outlet 215 at an opposite second end of the sealed container 203 is connected to the drain 233 such that acidic condensate liquid flowing through the operating path moves by gravity from the discharge port 241 through the input conduit 207 and through the neutralizing media in the sealed container 203 to the drain 233.

A bypass path, provided by a bypass conduit 245, connects the discharge port 241 directly to the drain 233 such that acidic condensate liquid from the discharge port 241 flows through the bypass conduit 245 directly to the drain 233 without flowing through the neutralizing media in the sealed container 203 when flow through the operating path is restricted.

The apparatus 201 comprises a discharge connector fitting 247 comprising an input port 247A adapted to be connected to the discharge port 241 on the appliance 211 to receive the acidic condensate liquid, and an operating port 247B oriented downward and connected to the input conduit 207. A vent port 247C is oriented upward and open to the atmosphere, and a bypass port 247D is connected to the bypass conduit 245. A float 219 is also mounted in the discharge connector fitting 247 as schematically illustrated in FIG. 9, and is configured to move to the raised position when acidic condensate liquid flows through the bypass port 247D.

Acidic condensate liquid flows from the discharge port 241 and down the operating path through the sealed container 203 to the drain 233. As debris gathers in the neutralizing media, this flow becomes restricted and slows and the level of acidic condensate liquid in the input conduit 207 rises and eventually rises to the level CL where acidic condensate liquid will begin to flow out through the bypass port 247D directly to the drain 233. At this point the float 219 rises to the raised position indicated by dotted lines and the float lock 221 locks the float 219 in the raised position.

The illustrated float lock 221 is a magnetic lock provided by a magnet 223 attached to a lock hanger 225 and the top end of the float 219 includes a steel element 227 that is attracted to the magnet 223. The magnet can of course also be attached instead to the float 219 and the steel element to the lock hanger 225.

The present disclosure further provides a method of alerting an operator to flow restrictions in a condensate neutralizer 1, 201 connected to an appliance 11, 211 that discharges an acidic condensate liquid where the condensate neutralizer comprises an operating path for acidic condensate liquid from the appliance 11, 211 through a neutralizing media to a drain 33, 233, and the condensate neutralizer provides a bypass path for acidic condensate liquid from the appliance directly to the drain when acidic condensate liquid flow through the neutralizing media is restricted. The method comprises providing a float 19, 119, 219 operative to move to a raised position visible to an operator when the acidic condensate liquid flows through the bypass path and locking the float in the raised position, for example with a float lock 21, 121, 221.

In a float system without the float lock, the float 19, 119, 219 will rise when acidic condensate liquid flows through the bypass path, but will fall when the appliance shuts down and the acidic condensate liquid level falls. An operator may not be in the area when the float is visible, and so will be unaware that the neutralizing media is plugged or approaching a plugged condition. In the presently disclosed condensate neutralizer apparatus 1, 201 when the acidic condensate liquid first flows through the bypass path the float rises and the float lock maintains the float in the raised position to alert the operator at any time after the first occurrence.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A condensate neutralizer apparatus for connection to an appliance that discharges an acidic condensate liquid, the apparatus comprising:
   a reservoir; and a divider wall dividing the reservoir into an input side and an output side;
   wherein the input side of the reservoir and the output side of the reservoir contain a neutralizing media;
   an input conduit adapted for connection to the appliance to receive the acidic condensate liquid;
   wherein the input conduit is connected to a reservoir inlet of the reservoir and a reservoir outlet of the reservoir is connected to a drain such that acidic condensate liquid flowing through an operating path flows from the reservoir inlet downward through the neutralizing media in the input side, under a bottom edge of the divider wall then upward through the neutralizing media in the output side and out through the reservoir outlet into an output conduit connected to the drain;
   wherein acidic condensate liquid flowing through a bypass path flows over a top edge of the divider wall from the input side of the reservoir to the output side of the reservoir and out through the reservoir outlet without flowing through the neutralizing media when flow through the operating path is restricted;
   a float configured to move to a raised position where the float provides an alert visible to an operator when the acidic condensate liquid flows through the bypass path; and
   a float lock operative to lock the float in the raised position.

2. The apparatus of claim 1 wherein the float is mounted in a top portion of the input side of the reservoir and is configured such that as acidic condensate liquid rises and falls above the neutralizing media in the input side of the reservoir the float moves correspondingly upward and downward, and wherein the float is configured such that the float moves to the raised position when a level of acidic condensate liquid in the input side of the reservoir approaches the top edge of the divider wall.

3. The apparatus of claim 1 wherein:
   the reservoir comprises a sealed container filled with neutralizing media and the input conduit is connected to the reservoir inlet at a first end of the sealed container and the reservoir outlet at an opposite second end of the sealed container is connected to the drain such that acidic condensate liquid flowing through the operating path flows through the neutralizing media to the drain; and
   the bypass path is provided by a bypass conduit connecting the appliance to the drain.

4. The apparatus of claim 3 comprising a discharge connector fitting comprising:
   an input port adapted to be connected to the appliance to receive the acidic condensate liquid;
   an operating port oriented downward and connected to the input conduit;
   a vent port oriented upward and open to the atmosphere;
   a bypass port connected to the bypass conduit.

5. The apparatus of claim 4 wherein the float is mounted in the discharge connector fitting and is configured to move to the raised position when acidic condensate liquid flows through the bypass port.

6. The apparatus of claim 1 wherein the float provides the alert by providing a visible surface visible to the operator.

7. The apparatus of claim 1 wherein the alert is provided by a light or sound.

8. The apparatus of claim 1 wherein the float lock comprises a lock hanger located above the float, a magnet attached to one of the lock hanger and a top end of the float, and a steel element attached to the other one of the lock hanger and the top end of the float.

9. The apparatus of claim 1 wherein the float lock comprises:
   a lock hanger located above the float;
   a hook pivotally attached to the lock hanger such that the hook hangs down from the lock hanger above the float;
   a hole defined in a top end of the float;
   and wherein the float lock is configured such that when the float rises the top end of the float contacts and pivots the hook to a side and when the float rises to the raised position the hook pivots back and engages the hole to secure the float in the raised position.

10. A method of alerting an operator to flow restrictions in a condensate neutralizer connected to an appliance that discharges an acidic condensate liquid where the condensate neutralizer comprises an operating path for acidic condensate liquid from the appliance downward through a neutralizing media in an input side of a reservoir, under a bottom edge of a divider wall then upward through the neutralizing media in the output side and out through the reservoir outlet into an output conduit connected to the drain, and the condensate neutralizer provides a bypass path for acidic condensate liquid from the appliance over a top edge of the divider wall from the input side of the reservoir to the output side without flowing through the neutralizing media and directly to the drain when acidic condensate liquid flow through the neutralizing media is restricted, the method comprising:

providing a float operative to move to a raised position visible to an operator when the acidic condensate liquid flows through the bypass path and locking the float in the raised position.

\* \* \* \* \*